US008037465B2

(12) United States Patent
Tian et al.

(10) Patent No.: US 8,037,465 B2
(45) Date of Patent: Oct. 11, 2011

(54) THREAD-DATA AFFINITY OPTIMIZATION USING COMPILER

(75) Inventors: Xinmin Tian, Union City, CA (US); Milind Girkar, Sunnyvale, CA (US); David C. Sehr, Cupertino, CA (US); Richard Grove, Nashua, NH (US); Wei Li, Redwood City, CA (US); Hong Wang, Fremont, CA (US); Chris Newburn, South Beloit, IL (US); Perry Wang, San Jose, CA (US); John Shen, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1284 days.

(21) Appl. No.: 11/242,489

(22) Filed: Sep. 30, 2005

(65) Prior Publication Data
US 2007/0079298 A1    Apr. 5, 2007

(51) Int. Cl.
*G06F 9/44* (2006.01)
*G06F 9/45* (2006.01)
(52) U.S. Cl. ........ 717/158; 717/131; 717/140; 717/151; 717/153
(58) Field of Classification Search .................. None
See application file for complete search history.

(56) References Cited

U.S. PATENT DOCUMENTS

| | | | |
|---|---|---|---|
| 6,961,930 B1 * | 11/2005 | Waldspurger et al. | 717/141 |
| 7,487,502 B2 * | 2/2009 | Wang et al. | 718/102 |
| 2004/0199904 A1 | 10/2004 | Schmidt | |
| 2004/0243981 A1 | 12/2004 | Luk et al. | |

OTHER PUBLICATIONS

Nikolopoulos et al."A case for User-Level Dynamic Page Migration" International Conference on Supercomputing Proceedings of the 14th international conference on Supercomputing, pp. 119-130, Year: 2000.*
PCT, Preliminary Report on Patentability (Chapter I of the Patent Cooperation Treaty), Application No. PCT/US2006/037576, mailed Apr. 10, 2008.
Marowka A.: "Analytic Comparison of Two Advanced C Language—Based Parallel Programming Models".; Parallel and Distribution Computing,; Third International Symposium on/Algorithms, Models and Tools for Parallel Computing on Heterogeneous Networks, Third International Workshop on Cork.; Ireland, Jul. 5, 2004,; Piscataway, NJ, USA.; IEEE, XP010752188.; pp. 284-291.
Prestor U et al.; "An application-centric ceNUMA memory profiler".; Workload Characterization,; WWC-4.; IEEE International Workshop Dec. 2, 2001.; Piscataway, NJ, USA.; pp. 101-110.; XP010583996.
PCT/ISR/WO/ISA,; International Application No. PCT/US2006/037576; International Filing Date Sep. 26, 2006.
EPO, Office Action for European Application No. 06825144.6, mailed Feb. 18, 2009, 7 pgs.
Office Action for CN Application No. 200680035461.6 mailed May 6, 2010, 13 pgs.
Office Action for CN Application No. 200680035461.6 mailed Nov. 10, 2010, 8 pgs.

* cited by examiner

*Primary Examiner* — Lewis Bullock, Jr.
*Assistant Examiner* — Mark Gooray
(74) *Attorney, Agent, or Firm* — Blakely, Sokoloff, Taylor & Zafman LLP

(57) ABSTRACT

Thread-data affinity optimization can be performed by a compiler during the compiling of a computer program to be executed on a cache coherent non-uniform memory access (cc-NUMA) platform. In one embodiment, the present invention includes receiving a program to be compiled. The received program is then compiled in a first pass and executed. During execution, the compiler collects profiling data using a profiling tool. Then, in a second pass, the compiler performs thread-data affinity optimization on the program using the collected profiling data.

19 Claims, 6 Drawing Sheets

THREAD-DATA AFFINITY OPTIMIZATION USING COMPILER

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND

1. Field

Embodiments of the present invention relate generally to the field parallel processing. More particularly, embodiments of the present invention relate to thread-data affinity in a multi-threaded environment.

2. Description of the Related Art

Parallel processing involves simultaneous execution of two or more instruction threads. Performing tasks simultaneously using multiple processors can greatly increase the performance of various applications. There are several parallel processing architectures, including the shared-memory multi-core processor, multiprocessor, and cache coherent non-uniform memory access (cc-NUMA) architectures. In the shared-memory multi-core processor and multiprocessor systems, multiple processing elements (e.g., central processing units (CPUs)) are operated in parallel by an operating system and access memory via a bus interconnect.

In contrast the cc-NUMA multiprocessing architecture has memory separated into close and distant banks. In the shared-memory multi-core processor and multiprocessor systems, all processing elements access a common memory at the same speed. In cc-NUMA, memory on the same processor board as the processing element (local memory) is accessed faster than memory on other processor boards (shared memory), hence the "non-uniform" nomenclature. As a result, the cc-NUMA architecture scales much better to higher numbers of processing elements than the shared-memory multi-core processor and multiprocessor systems. "Cache coherent NUMA" means that caching is supported in the local system. As a practical matter, most large scale NUMA systems are cc-NUMA systems, NUMA and cc-NUMA will be used interchangeable in this description. The differences between NUMA and cc-NUMA are not of particular relevance for the understanding of the various embodiments of the invention described herein.

FIG. 1 is a block diagram of an example cc-NUMA architecture. FIG. 1 shown nodes 1-4. A larger parallel system may have many more nodes, but only four are shown for simplicity. Each node is shown as having one or more processing elements (sometimes also referred to as "cores"), shown as processing elements 5-11. Each node also has a local memory, shown as memories 13-16. This is merely and illustration; nodes may have more than two processing elements and more than one local memory connected to such processing elements via a bus.

A memory local to one processing element may not be local to another processing element. For example, for processing element 5, memory 13 is local and fast to access. However, for processing element 5, memory 15 is not local. Processing element 5 can access memory 15 via the link connecting node 1 and node 3; however, this access will have significantly higher latency than local memory access. Accessing memory 16 from processing element 5 has even higher latency, since two separate links must be traversed.

It is thus apparent, that it is desirable to have data used by an execution thread in local memory. The technical term for this is "thread-data affinity." In a multi-threaded system, data may be used by one processing element at one time, and then by another non-local processing element at another time. Thread-data affinity refers to the problem of moving data to a memory local to the processing element executing a thread using the data.

There have been several attempts made to address the thread-data affinity problem. One type of approach is extending high-level programming languages to allow data distribution directives inserted by the programmer. However, this method compromises the simplicity of the program model, and cannot handle irregular memory access patterns in a timely fashion. Furthermore, it requires additional programming to be performed.

A second approach uses a deamon (also called a service) executed in the background by the operating system to perform page migration as deemed appropriate for the applications being executed by the operating system. This approach, however, does not exploit the correlation between page migration policies and program semantics and has poor responsiveness A third approach provides a user with a set of library routines that can be inserted into programs to trigger page migration. This approach, however, is prone to introducing side-effects at compile time when compiler optimizations are preformed.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Two-Pass Compiling and Profiling Tools

Figure 1:
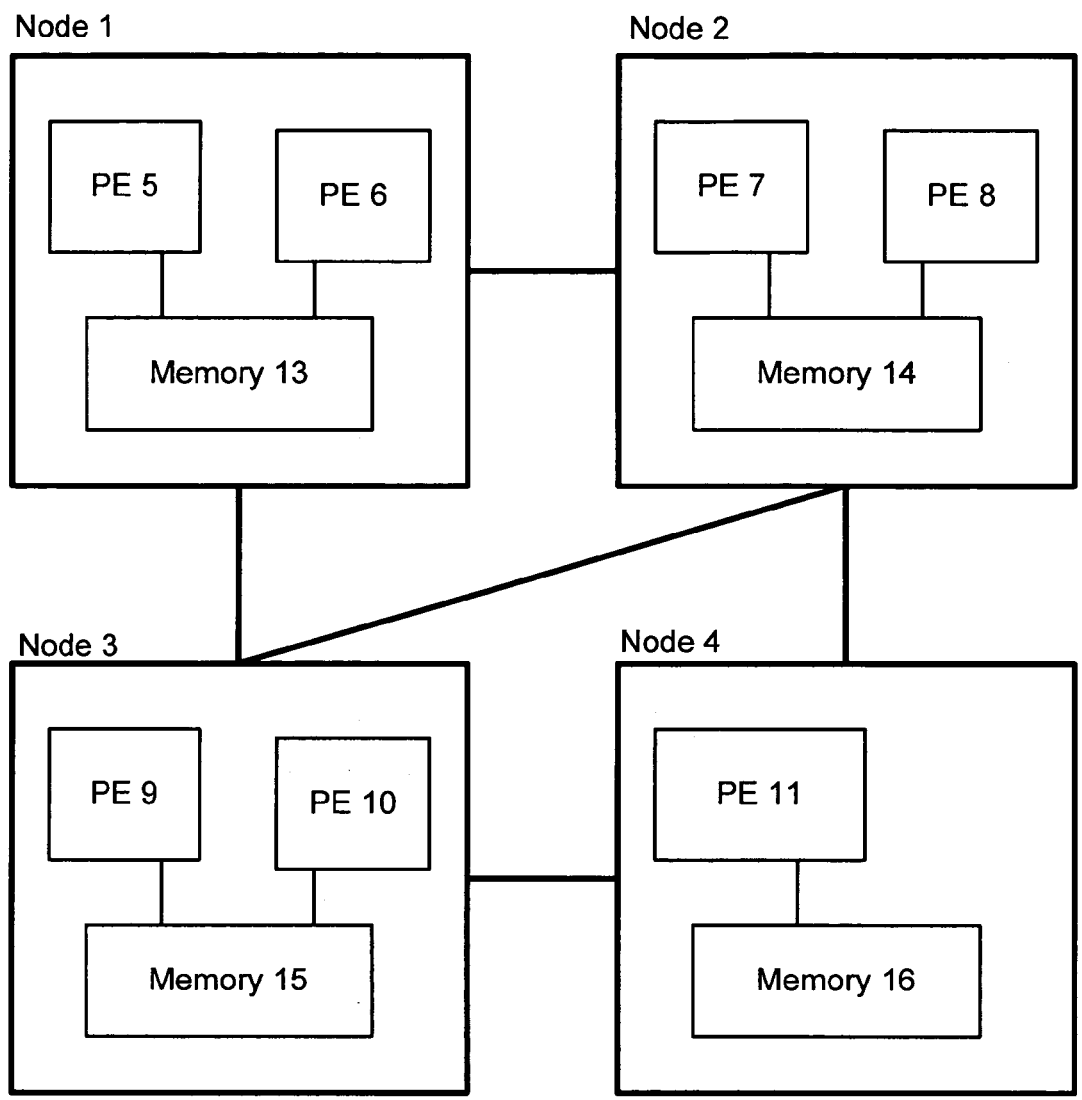
FIG. 1 is a block diagram illustrating a cache coherent non-uniform memory access (cc-NUMA) processing platform.

In one embodiment, the compiler implements a two-pass compilation scheme to carry out thread-data affinity optimization. A compiler is software that translates a computer program written in a high-level language, such as C++ or FORTRAN, into machine language. The compiler will generally translate the high-level code written by a programmer into an intermediate representation (IR) used inside the compiler. The IR can be compiler-specific and some well-known examples include the RTL representation, the Stanford University Intermediate Format (SUIF) representation and the WHIRL intermediate representation of the MIPSpro Compiler from Silicon Graphics Incorporated, among others. The embodiments of the present invention are not limited to any specific compiler or specific IR used.

While in one embodiment the code insertion described below occurs at the IR level, this is not necessarily so. Furthermore, some examples may show code insertion at the high-level code stage for ease of understanding. Embodiments of the present invention can be implemented at various stages of the compiling process.

One embodiment of such a two-pass scheme is now described with reference to FIG. 2. In block 202, the compiler performs regular compiling and generates a multi-threaded binary executable from the source code provided to it by the programmer. In block 204, the binary (i.e., the program) is executed and a profiling tool is used to collect information about the execution of the program. In one embodiment, a sampling-based profiling tool is used that samples the execution at some cycle interval and makes a record about the processing. Such profiling tools can be used by compilers to estimate statically unknown trip-counts for loops and other information only available at run-time. In one embodiment, the profiling tool collects information about remote memory loads and other such memory access expressions.

In block 206, the compiler begins the second pass of the two-pass scheme. As mentioned about, the two-pass scheme has advantages besides thread-data affinity optimization, as the information collected by the profiling tool is also useful to other optimizations not of importance to the subject matter of the present application. For example, in block 206 peephole and inter-procedural optimizations (IPO) are performed.

In block 208, parallelization optimization is performed by the compiler. Parallelization optimization identifies loops or other constructs that can be divided into several threads and executed in parallel. It can be done by hand by the programmer, or automatically by the compiler. In one embodiment, the parallelization optimization is done to support the OpenMP shared-memory programming model, which is a well-known industry standard. The OpenMP Specification Version 2.5 is available at http://www.openmp.org.

In block 210, the compiler performs various other high-level optimizations such as loop unrolling, loop interchange, loop fusion, loop distribution, loop peeling, multi-versioning and data transformations. In one embodiment, such optimizations include automatic loop parallelization. In block 212, scalar optimization is performed, and the optimized executable binary is generated. However, blocks 206, 208, and 210 can, on demand, invoke block 214, in which thread-data affinity optimization is performed. In one embodiment, the thread-data affinity optimization is invoked when the program is compiled for executing on multi-core processor and hyper-threaded processor based cc-NUMA multiprocessor systems, and hot loops that are identified have lower performance due to poor thread-data affinity.

Thread-Data Affinity Optimization

Figure 2:
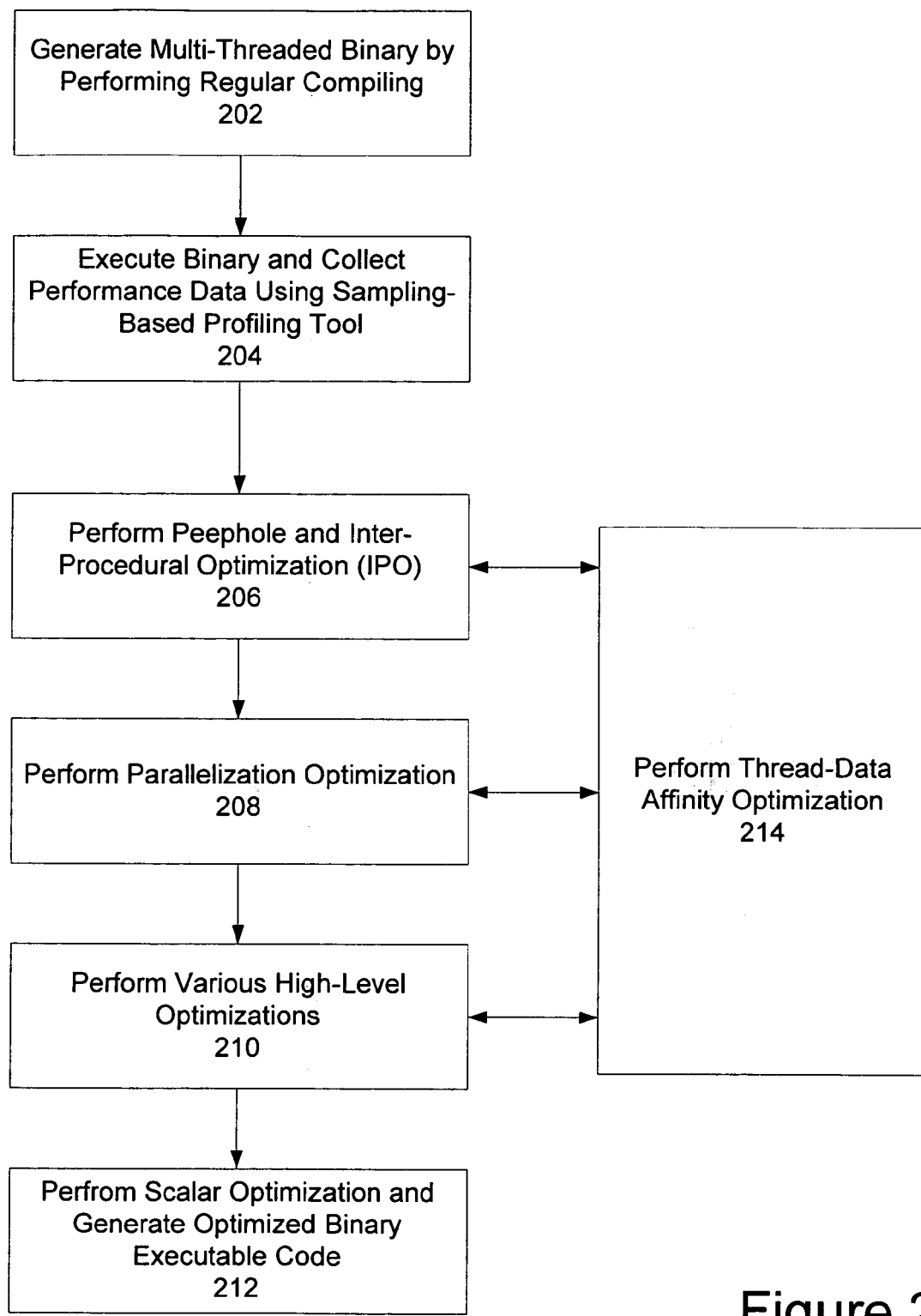
FIG. 2 is a flow diagram illustrating two-pass compiling according to one embodiment of the present invention.

One embodiment of the thread-data affinity optimization of block 214 of FIG. 2 is now described in more detail with reference to FIG. 3. In block 302, the compiler collects the remote load data collected by the profiling tool in block 204 of FIG. 2. In one embodiment, the compiler uses the remote load data—data regarding individual expressions and remote accesses associated with each expression—to build a remote load table. The remote load table is a table populated with the remote load data. Thus, the remote load table includes expressions and latencies. In one embodiment the latencies are expressed in clock cycles.

In block 304, the compiler determines the average remote latency associated with each separate expression. The remote load table can contain multiple pieces of information about the same expression. By determining the average remote latencies, a single statistic can be associated with each separate expression, such as a load.

In block 306, a service routine is generated for each loop, the service routine programmed to move data to affect the thread-data affinity. In one embodiment, the service routine is loop-specific. However, in other embodiment, the service routine can be generated to correspond to a hot code block (code block being thread-data affinity optimized because of available performance gain) or an individual expression, such as a load. In one embodiment, the service routine is tightly integrated to the program at execution as part of executing code itself. In another embodiment, the service routine can be inserted into a library available to the program at execution. In one embodiment the service routine is programmed to execute upon the occurring of a yield event, with the previously executing thread resuming upon the execution of the service routine.

In block 308, a trigger condition is determined for each expression in the remote load table. In one embodiment, the trigger condition is based on the average remote latency associated with the particular expression. The trigger condition can be expressed in terms of a number of remote accesses for an expression, a threshold latency for remote accesses for an expression, a combination of these factors, or in a number of other ways. In one embodiment the triggering condition is a function of the number of remote loads and the average latency of remote loads within a code block. For example, in one embodiment, the compiler determines the triggering condition for each expression according to the formula shown in Equation 1 below:

$$N_{trigger}(P) = \sum_{k=1}^{N} \left( \text{fraction} \times L_{max\text{-}ave} \leq L_{ave}(RLE_k) \right) \quad \text{(Equation 1)}$$

where $N_{trigger}(P)$ denotes the number of remote loads whose profiled average latency is greater than (or equal to) a fraction (0<fraction≦1) of the maximum average latency for the code block P. In one embodiment, $N_{trigger}(P)$ is used as the triggering condition of invoking the service routine for the loop containing the expression whose trigger is being calculated. In the formula above, N denotes the number of distinct remote loads (not located within the same remote memory page) within code block P, $L_{max\text{-}ave}$ denotes the maximum average-latency of distinct remote loads within the code block P, and $L_{ave}(RLE_k)$ denotes the average latency of the expression (i.e., remote load $RLE_k$.) The yield can be triggered (i.e. the triggering condition can be satisfied) by 1—in an aggressive scheme that triggers data movement upon the first remote access—up to N—in a conservative scheme that triggers data movement only upon one of the last remote accesses, or anywhere in between.

In block 310, the compiler generates a monitor instruction to be associated with each triggering condition, and inserts the monitor instructions into the IR code as part of the optimization process. In one embodiment, the monitor instruction is supported by hardware, and when the monitor instruction is executed, it enables a set of hardware performance counters to keep track of the monitored memory load expressions and their physical memory locations associated with these monitored load expressions to count how many accesses are remote memory loads. In another embodiment, the performance counters also keep track of the latency associated with the monitored load expressions.

The interaction between the service routine, the triggering condition causing the execution of the service routine, and the performance monitor providing the data used by the triggering condition can be established in a number of ways. In one embodiment, a channel can be established for each execution thread to contain the architectural state of a scenario. A scenario is a composite condition, such as the triggering condition. When the scenarios triggering condition is met, a yield event can be triggered to execute the service routine.

Figure 3:
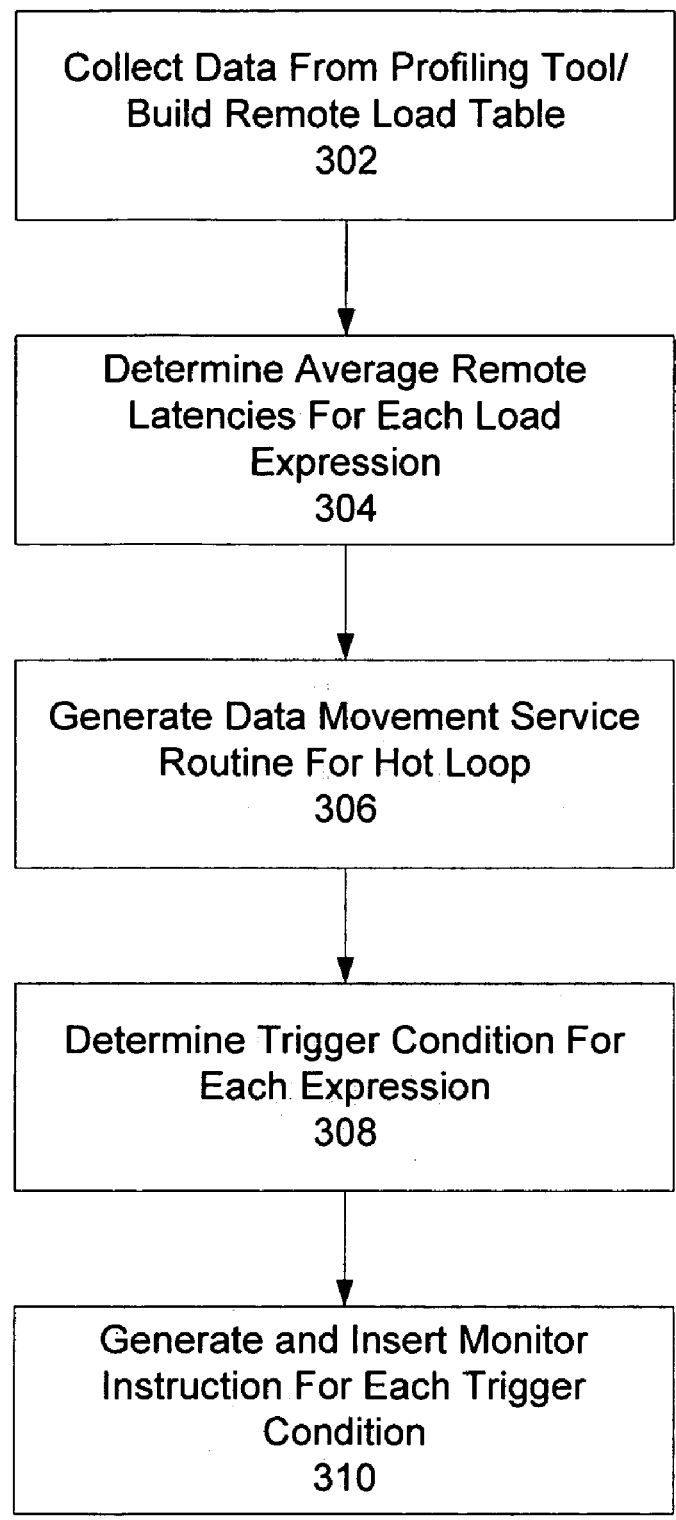
FIG. 3 is a flow diagram illustrating thread-data affinity optimization according to one embodiment of the present invention.

The order of the blocks is shown in FIG. 3 is only for ease of understanding; they can be performed in another order as well. For example, the triggering condition may be determined before the service routines are generated. Furthermore, blocks 306 to 310 may be performed in sequence for each expression in the remote load table. These are merely examples to illustrate that the FIG. 3 represents merely some embodiments of the present invention.

When the thread-data affinity optimization of FIG. 3 is done, the thread-data affinity optimized IR is again translated to a binary executable. In one embodiment, the program—as compiled on this second pass—includes triggering conditions to affect data migration, monitor code to determine whether the triggering conditions have been met, and service routines to perform data migration when the triggering conditions have been met. These portions of code are generated by the compiler on the second pass and were not part of the program executed in block 204 of FIG. 2.

Optimized Code Execution

Figure 4:
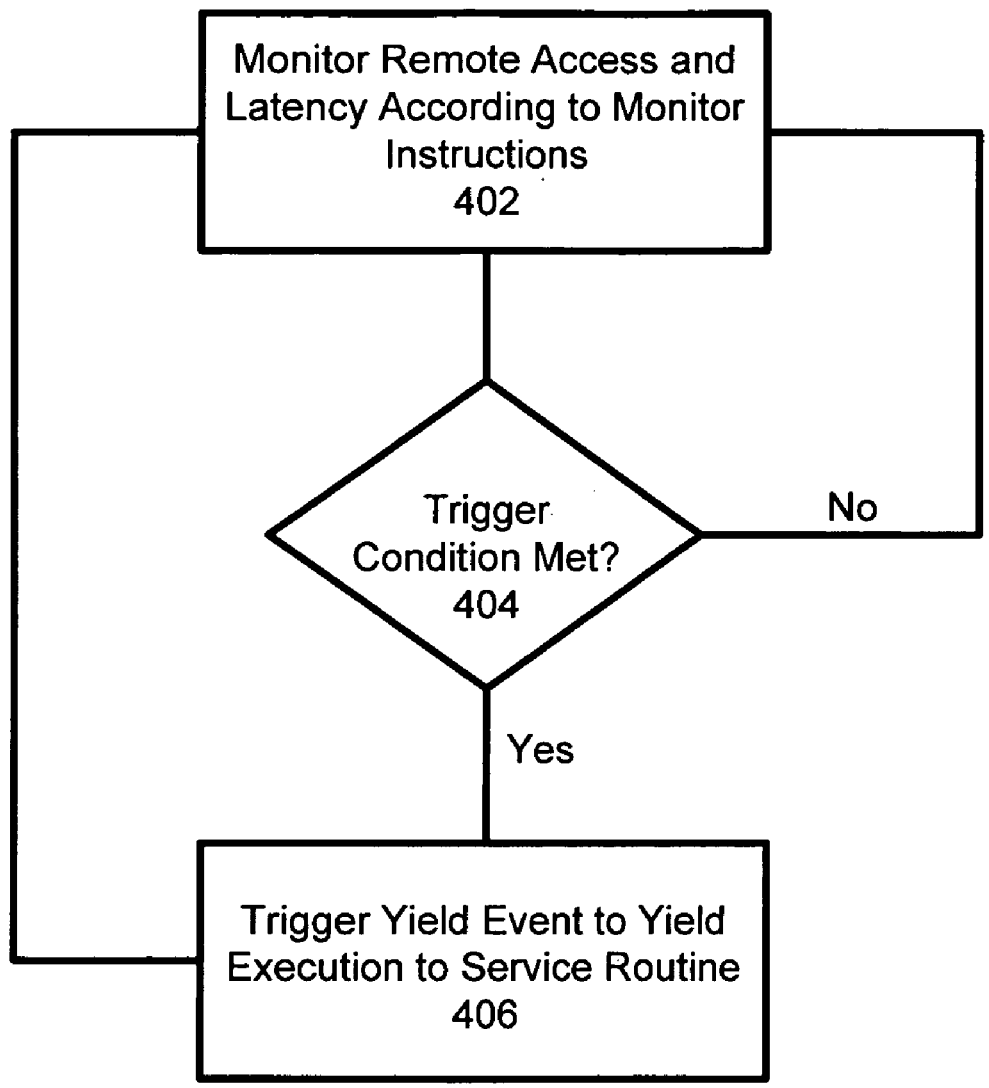
FIG. 4 is a flow diagram illustrating execution of a program thread-data affinity optimized according to one embodiment of the present invention.

One embodiment of execution thread-data affinity optimized code as generated by a compiler implementing one embodiment in the present invention is now described with reference to FIG. 4. In block 402 the new binary executable is executed, and performance information about remote accesses and associated latencies is collected according to the monitor instructions inserted by the compiler in block 310 of FIG. 3. Such performance data can include remote data access frequency, statistics, latency, latency statistics such as average latency for remote loads, and other such information.

In block 404, there is a determination made as to whether the trigger condition of a monitored remote access has been met, i.e. whether a scenario's composite condition is satisfied. The triggering condition may include a number of remote accesses, a remote access statistic or frequency (e.g., 50 remote accesses per second), a threshold average latency for the load, or some other such mechanism. If the triggering condition has not been met, then processing continues at block 402 with the execution of the optimized binary and collection of remote access and latency data.

If, however, the triggering condition is determined to have been met in block 304, then, in block 306, a yield event is triggered, to yield execution of the current thread to a service routine. The service routine performs data movement to provide better thread-data affinity for the monitored load expression and the hot loop. In one embodiment, the service routine yielded to is specifically associated with the hot loop and the triggering condition.

The service routine can move data by copying, moving, or maintaining an image of some sort. After the service routine completes execution, the yield event terminates and the thread executing prior to the yield event resumes execution.

Example Compiler Architecture

Figure 5:
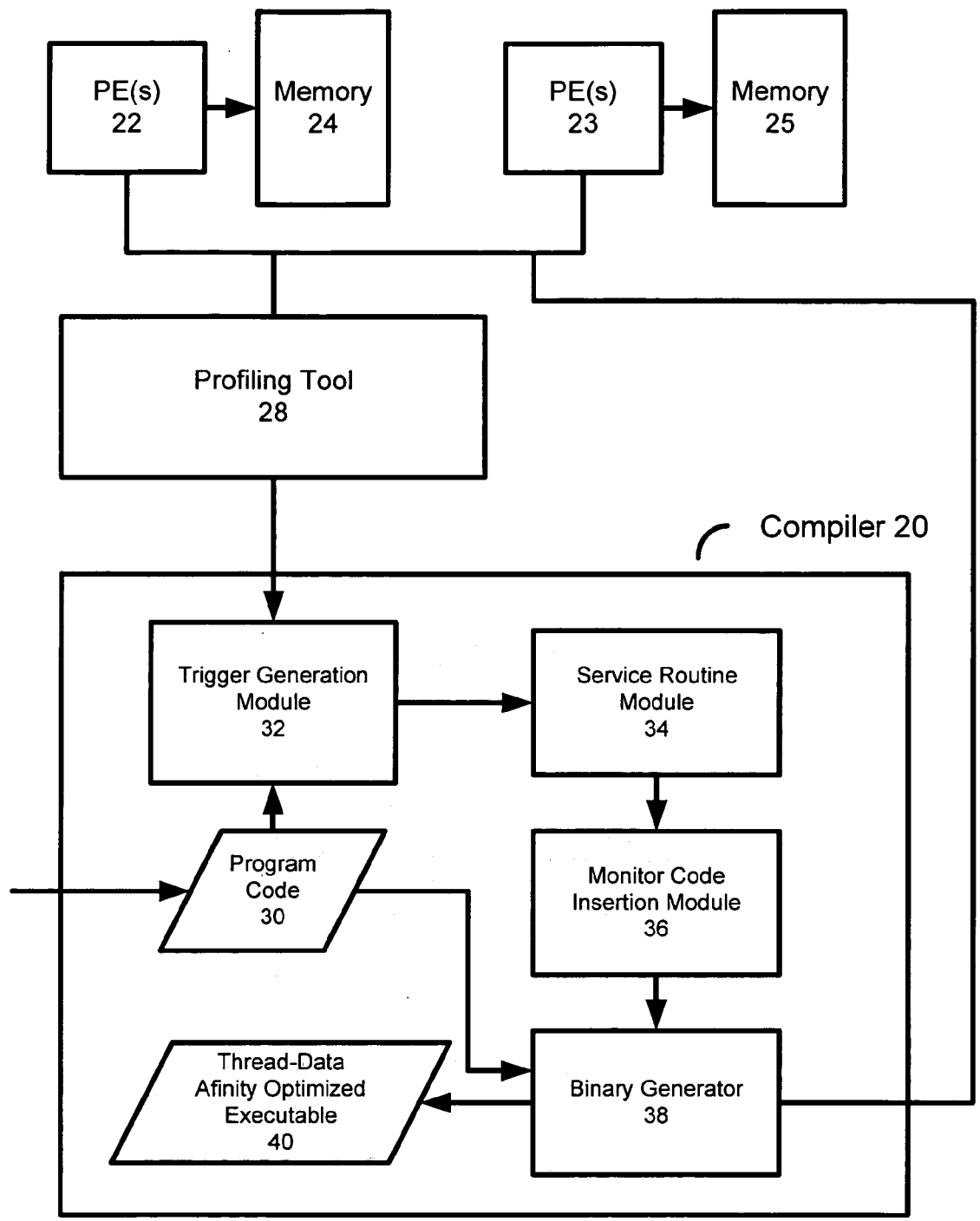
FIG. 5 is a block diagram illustrating a compiler architecture according to one embodiment of the present invention.

An example compiler that implements one embodiment of the present invention is now described with reference to FIG. 5. The modules and components described are described separately for ease of understanding. A compiler is a software program, and does not need to be divided according to the modules described. The compiler 20 is shown in a cc-NUMA environment having two nodes, the first node represented by processing element 22 and memory 24 and the second node represented by processing element 23 and memory 25. Only two nodes are shown for simplicity. For a thread being executed by processing element 22, accessing memory 24 is a local access and accessing memory 25 is a remote access with more latency. Similarly, for a thread being executed by processing element 23, accessing memory 25 is a local access and accessing memory 24 is a remote access.

Profiling tool 28 interfaces with he parallel processing system represented by the two nodes. In one embodiment, profiling tool 28 is a sampling-based profiling tool as described above. The compiler 20 receives program code 30 from some word-processing application used by a programmer to create the program code 30. The program code 30 is then translated to IR for the convenience of the compiler 20. The IR is provided to binary generator 38 which generates the binary executable that is executed by the processing elements.

As the program executes, the profiling tool 28 collects remote access and latency data and provides this information to the trigger generation module 32 to be used for thread-data affinity optimization during the second pass of the two-pass compiling. The trigger generation module 32 generates the triggering condition. The service routine module 34 generates the service routine to carry out the data migration and programs it into a library accessible to the program.

The monitor code insertion module 36 inserts the monitor instructions to enable the remote memory access monitoring using the performance counters. The binary generation module 38 on the second pass compiling inserts all generated code into the program code 30 to create the thread-data affinity optimized code 40.

Example Computer System

Figure 6:
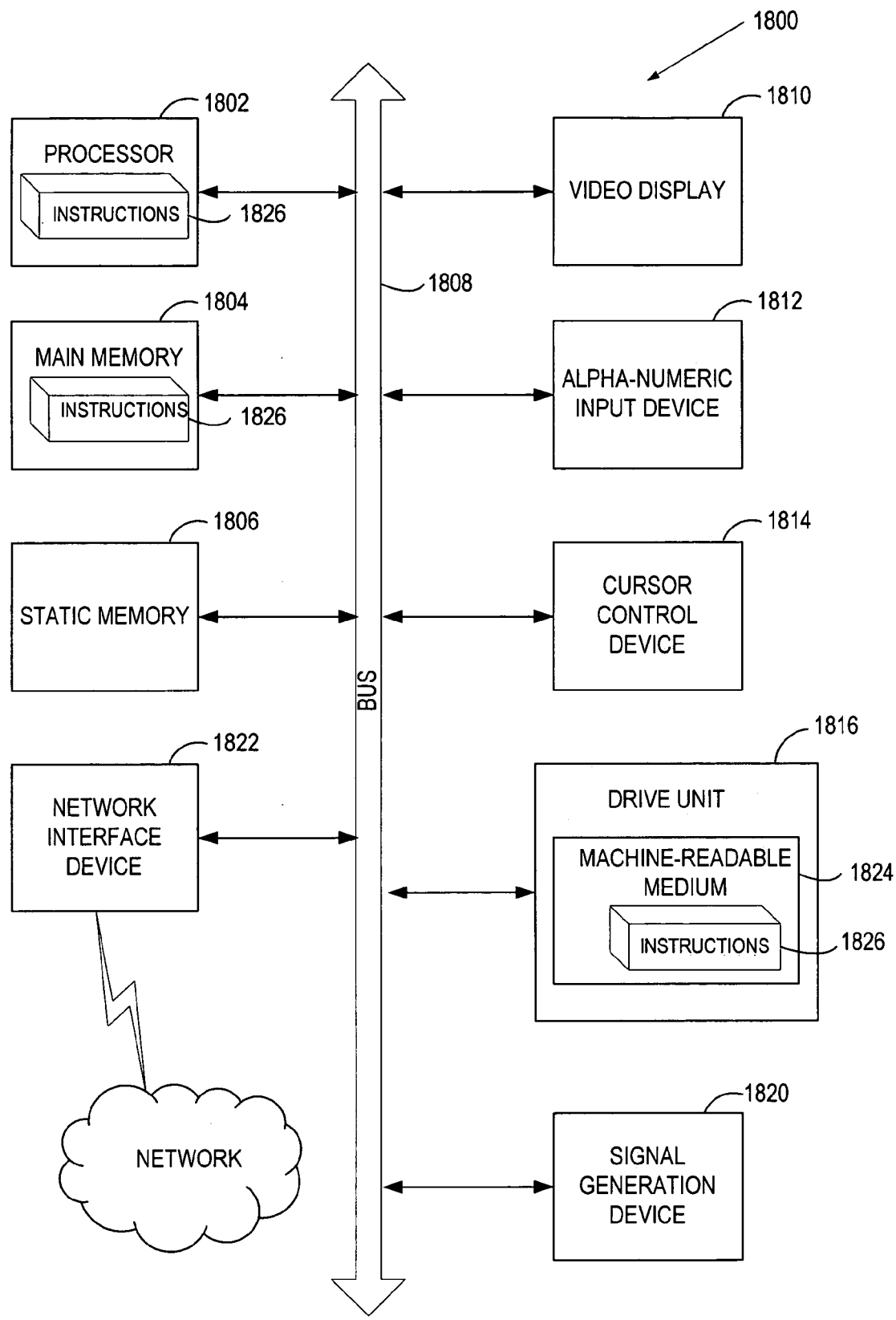
FIG. 6 is a block diagram illustrating an example computing system according to one embodiment of the present invention.

Various embodiments of the present invention have been described in the context of a compiler that generates code that is inserted into a program being compiled by the compiler. An example computer system on which such a compiler can be implemented (e.g., a node of a parallel computing system) is now described with reference to FIG. 6. Computer system 1800 that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1800 includes a processor 1802, a main memory 1804 and a static memory 1806, which communicate with each other via a bus 1808. The computer system 1800 may further include a video display unit 1810 (e.g., a liquid crystal display (LCD) or a cathode ray tube (CRT)). The computer system 1800 also includes an alpha-numeric input device 1812 (e.g., a keyboard), a cursor control device 1814 (e.g., a mouse), a disk drive unit 1816, a signal generation device 1820 (e.g., a speaker) and a network interface device 1822.

The disk drive unit 1816 includes a machine-readable medium 1824 on which is stored a set of instructions (i.e., software) 1826 embodying any one, or all, of the methodologies described above. The software 1826 is also shown to reside, completely or at least partially, within the main memory 1804 and/or within the processor 1802. The software 1826 may further be transmitted or received via the network interface device 1822. For the purposes of this specification, the term "machine-readable medium" shall be taken to include any medium that is capable of storing or encoding a sequence of instructions for execution by the computer and that cause the computer to perform any one of the methodologies of the present invention. The term "machine-readable medium" shall accordingly be taken to included, but not be limited to, solid-state memories, optical and magnetic disks, and carrier wave signals.

General Matters

In the description above, for the purposes of explanation, numerous specific details have been set forth. However, it is understood that embodiments of the invention may be practiced without these specific details. In other instances, well-known circuits, structures and techniques have not been shown in detail in order not to obscure the understanding of this description.

Embodiments of the present invention include various processes. The processes may be performed by hardware components or may be embodied in machine-executable instructions, which may be used to cause one or more processors programmed with the instructions to perform the processes. Alternatively, the processes may be performed by a combination of hardware and software.

Embodiments of the present invention may be provided as a computer program product that may include a machine-readable medium having stored thereon instructions, which may be used to program a computer (or other electronic device) to perform a process according to one or more embodiments of the present invention. The machine-readable medium may include, but is not limited to, floppy diskettes, optical disks, compact disc read-only memories (CD-ROMs), and magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method in a compiler, the method comprising:
   performing a first compiling operation to produce an intermediate representation of a source code;
   generating a first pass multi-threaded executable binary from the intermediate representation;
   executing the first pass multi-threaded executable binary to collect sampling data from its first pass via execution on a Non-Uniform Memory Access (NUMA) platform;
   building a remote load table of the first pass multi-threaded executable binary based on the sampling data, wherein the remote load table lists load expressions from the first pass of the first pass multi-threaded executable binary and memory load latency data for each of the load expressions listed in the remote load table;
   determining, via the compiler, a triggering condition for each load expression in the remote load table based on the memory load latency data associated with each load expression and a threshold latency for each load expression;
   performing a second compiling operation in which the compiler inserts code into the intermediate representation to monitor for the triggering conditions; and
   generating a second pass multi-threaded executable binary that is thread-data affinity optimized based on the triggering condition determined for each load expression from the compiled instrumented intermediate representation, wherein the intermediate representation performs data migration when the triggering conditions are met.

2. The method of claim 1, wherein the code inserted into the immediate representation to monitor for the triggering conditions and perform the data migration when the triggering conditions are met comprises inserting code to trigger execution of a service routine to perform the data migration.

3. The method of claim 1, wherein the monitor instruction when executed, enables a set of hardware performance counters to count how many accesses are remote memory loads when each load expression is being executed.

4. The method of claim 1, wherein the sampling data comprises:
   a list of remote load expressions;
   a number of remote accesses associated with each remote load expression in the list of remote load expressions; and
   a latency associated with each remote access for each remote load expression in the list of remote load expressions.

5. The method of claim 4, wherein determining the triggering condition for each load expression comprises determining an average latency for each load expression.

6. A compiler comprising instructions for:
   performing a first compiling operation to produce an intermediate representation of a source code;
   generating a first pass multi-threaded executable binary from the intermediate representation;
   executing the first pass multi-threaded executable binary to collect sampling data from its first pass via execution on a Non-Uniform Memory Access (NUMA) platform;
   building a remote load table of the first pass multi-threaded executable binary based on the sampling data, wherein the remote load table lists load expressions from the first pass of the first pass multi-threaded executable binary and memory load latency data for each of the load expressions listed in the remote load table;
   determining, via the instructions of the compiler, a triggering condition for each load expression in the remote load table based on the memory load latency data associated with each load expression and a threshold latency for each load expression;
   performing a second compiling operation in which the instructions of the compiler inserts code into the intermediate representation to monitor for the triggering conditions; and
   generating a second pass multi-threaded executable binary that is thread-data affinity optimized based on the triggering condition determined for each load expression from the compiled instrumented intermediate representation, wherein the intermediate representation performs data migration when the triggering conditions are met.

7. The compiler of claim 6, wherein the second pass executable that is thread-data affinity optimized includes both a service routine to perform the data migrations to be triggered by the code inserted into the immediate representation and wherein the second pass executable further includes monitor instructions to monitor for the triggering conditions.

8. The compiler of claim 7, wherein a trigger generation module of the compiler determines the triggering condition for each load expression by determining a threshold number of times each load expression performs a remote access before the service routine is triggered.

9. The compiler of claim 6, wherein a monitor code insertion module of the compiler generates the monitor instruction to, when executed, enable a set of hardware performance counters to count how many accesses are remote memory loads when each load expression is being executed.

10. The compiler of claim 6, wherein the sampling data comprises 1) a list of remote load expressions, 2) a number of remote accesses associated with each remote load expression in the list of remote load expressions, and 3) a latency associated with each remote access for each remote load expression in the list of remote load expressions.

11. The compiler of claim 10, wherein a trigger generation module of the compiler determines the triggering condition by determining an average latency for each remote load expression.

12. A non-transitory machine-readable medium having stored thereon instructions that, when executed by a processor, cause a compiler to perform operations comprising:
performing a first compiling operation to produce an intermediate representation of a source code;
generating a first pass multi-threaded executable binary from the intermediate representation;
executing the first pass multi-threaded executable binary to collect sampling data from its first pass via execution on a Non-Uniform Memory Access (NUMA) platform;
building a remote load table of the first pass multi-threaded executable binary based on the sampling data, wherein the remote load table lists load expressions from the first pass of the first pass multi-threaded executable binary and memory load latency data for each of the load expressions listed in the remote load table;
determining, via the compiler, a triggering condition for each load expression in the remote load table based on the memory load latency data associated with each load expression and a threshold latency for each load expression;
performing a second compiling operation in which the compiler inserts code into the intermediate representation to monitor for the triggering conditions; and
generating a second pass multi-threaded executable binary that is thread-data affinity optimized based on the triggering condition determined for each load expression from the compiled instrumented intermediate representation, wherein the intermediate representation performs data migration when the triggering conditions are met.

13. The non-transitory machine-readable medium of claim 12, wherein determining the triggering condition for each load expression comprises determining a threshold number of times each load expression performs a remote access before a service routine is triggered to perform a data migration based on the triggering condition being met.

14. The non-transitory machine-readable medium of claim 12, wherein monitoring for the triggering conditions comprises enabling a set of hardware performance counters to count how many memory accesses are remote memory loads when each load expression is being executed.

15. The non-transitory machine-readable medium of claim 12, wherein the sampling data comprises a list of remote load expressions, a number of remote accesses associated with each remote load expression in the list of remote load expressions, and a latency associated with each remote access for each remote load expression in the list of remote load expressions.

16. A Non-Uniform Memory Access (NUMA) system comprising:
a compiler to:
perform a first compiling operation to produce an intermediate representation of a source code, and to
generate a first pass multi-threaded executable binary from the intermediate representation;
a profiling tool to:
execute the first pass multi-threaded executable binary to collect sampling data from its first pass via execution on a Non-Uniform Memory Access (NUMA) platform, and to
build a remote load table of the first pass multi-threaded executable binary based on the sampling data, wherein the remote load table lists load expressions from the first pass of the first pass multi-threaded executable binary and memory load latency data for each of the load expressions listed in the remote load table;
a monitor code instruction module to determine a triggering condition for each load expression in the remote load table based on the memory load latency data associated with each load expression and a threshold latency for each load expression;
wherein the compiler is to further perform a second compiling operation in which the compiler inserts code into the intermediate representation to monitor for the triggering conditions; and
a binary generator module to generate a second pass multi-threaded executable binary that is thread-data affinity optimized based on the triggering condition determined for each load expression from the compiled instrumented intermediate representation, wherein the intermediate representation performs data migration when the triggering conditions are met.

17. The NUMA system of claim 16, wherein the inserted code causes a service routine to migrate data from a first node within the NUMA system to a second node within the NUMA system.

18. The NUMA system of claim 16, further comprising:
a processor to:
execute a first thread of the second pass thread-data affinity optimized executable binary,
monitor a load expression of the first thread of the second pass thread-data affinity optimized executable binary by counting how many times the load expression requires a remote access during execution, and
trigger a service routine when the load expression requires the remote access more than a threshold number of times; and
a service routine module to:
execute the service routine, wherein the service routine to migrate data from a first node within the NUMA system to a second node within the NUMA system to optimize thread-data affinity within the NUMA system for the first thread, and
allow resumption of the execution of first thread upon termination of execution of the service routine.

19. The method of claim 2, wherein determining the triggering condition for each load expression comprises determining a threshold number of times each load expression performs a remote access before a service routine is triggered.

* * * * *